Jan. 3, 1950 — J. W. DUNN — 2,493,234
VENETIAN BLIND SUPPORTING MEANS
Filed Jan. 16, 1946 — 4 Sheets-Sheet 1
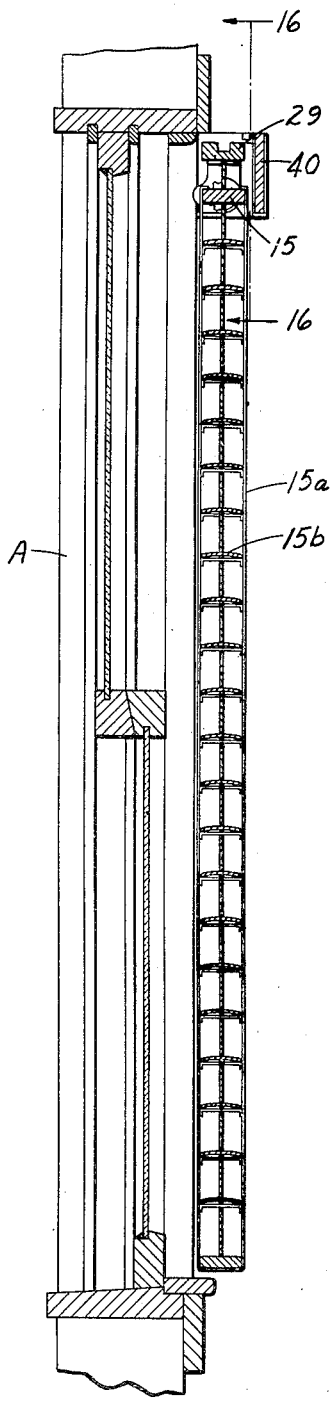
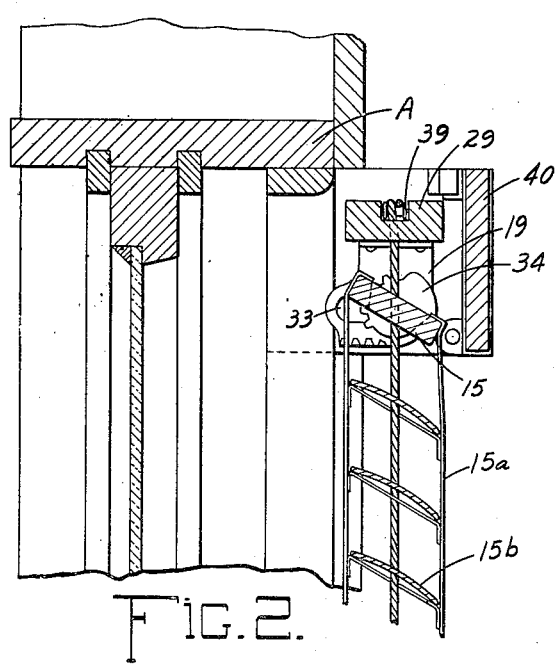
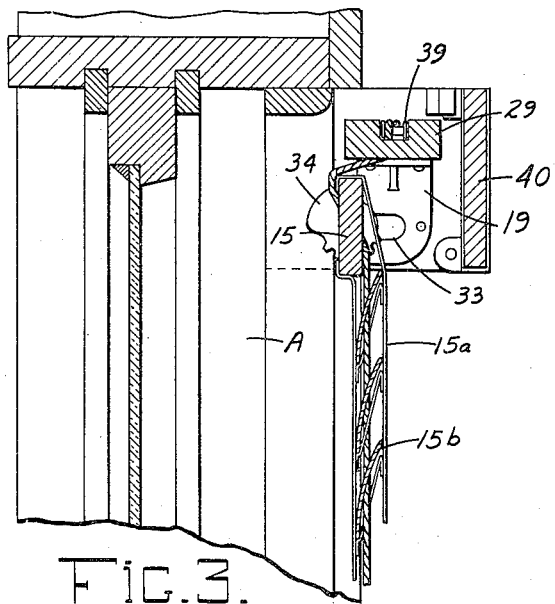
INVENTOR.
John W. Dunn
BY Robert Robb
Attorneys Jan. 3, 1950 — J. W. DUNN — 2,493,234
VENETIAN BLIND SUPPORTING MEANS
Filed Jan. 16, 1946 — 4 Sheets-Sheet 2

INVENTOR.
John W. Dunn
BY Robert Robb
Attorneys

Jan. 3, 1950 J. W. DUNN 2,493,234
VENETIAN BLIND SUPPORTING MEANS
Filed Jan. 16, 1946 4 Sheets-Sheet 3

INVENTOR.
John W. Dunn
BY Robert Pohl
Attorneys

Jan. 3, 1950 J. W. DUNN 2,493,234
VENETIAN BLIND SUPPORTING MEANS
Filed Jan. 16, 1946 4 Sheets-Sheet 4

INVENTOR.
John W. Dunn
BY Robert Robb
Attorneys

Patented Jan. 3, 1950

2,493,234

UNITED STATES PATENT OFFICE 2,493,234

VENETIAN BLIND SUPPORTING MEANS

John W. Dunn, Alhambra, Calif.

Application January 16, 1946, Serial No. 641,528

7 Claims. (Cl. 160—167)

My present invention pertains to the art of Venetian blinds, and involves primarily improvements in the type of construction of such blinds and hardware appurtenant thereto, as embodied in my Patent No. 2,413,754, issued January 7, 1947.

In the construction of my Venetian blind improvements as embodied in the above patent I utilize a customary form of Venetian blind slat unit in which the slats are tilted in largely the usual way in order to close and open the blind. However, the blind unit is peculiarly supported by the tilt bar and the mounting means for the tilt bar so that the operating devices for effecting the tilting movement of the slats may cause a travel movement of the tilt bar inwardly and outwardly relatively to the frame of the window on which the blind is mounted. The purpose of this bodily travel movement of the blind is to shift the latter when it is closed, by tilting the slats to closed position, to a general position close to the window frame part, whereby to eliminate any vision openings at the vertical edges of the blind, and opposite tilting of the slats toward open or fully open position effecting a movement of the blind as a unit away from the window frame, at which time the matter of vision openings is not important.

The primary purpose of my present invention has been to improve upon the hardware supporting and operating parts for the Venetian blind unit by which the tilting of the slats is performed, and by which the blind unit is supported on the frame of the window.

The improved parts of the invention involve primarily the bracket means which are adapted to support the blind unit for its horizontal movement bodily, previously referred to as a travel movement, inwardly and outwardly relatively to the window frame, with which bracket means coact certain presently novel forms of travel pinion or gear members directly supporting the tilt bar, the supporting brackets having rack members the teeth of which coact with said travel compelling pinion or gear members. Another feature of the present improvements lies in the provision of peculiar guide members on the movable pinion or gear members that carry the tilt bar, which guide members coact with stationary parts on the bracket means for preventing the teeth of the gear or pinion members from over-riding beyond the teeth of the rack of the bracket means to the extent of maintaining the last mentioned parts in a proper relation when the Venetian blind unit has moved outwardly toward the window frame to its maximum extent of movement obtained when the slats of the unit are completely closed.

My present improvements also involve other detail parts of the operating and supporting devices for the blind unit, designed primarily with a view to facilitating manufacture by die casting process.

With the foregoing in view, a full understanding of my invention will be had upon reference to the following detail description, in connection with the accompanying drawings, and in the latter:

Figure 1 is a vertical sectional view of a window frame having my blind unit as shown in operative position thereon with the slats open.

Figure 2 is an enlarged sectional view of the upper portion of the window frame showing the upper end of the blind unit with the hardware parts for supporting the same, the slats of the unit being shown open.

Figure 3 is a view similar to Figure 2, but illustrating the tilt bar so tilted as to effect a closing action of the slats of the blind, the tilt bar being shown in its outermost position of extreme movement toward the window frame, eliminating any vision openings at the vertical edges of the blind and between it and the sides of the frame.

Figure 10:
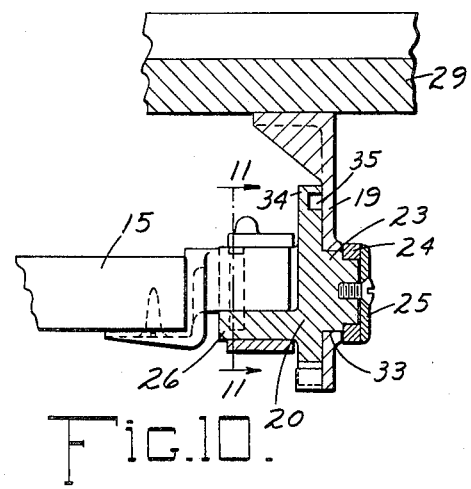
Figure 10 is a vertical sectional view, fragmentary in nature, taken about on the line 10—10 of Figure 9.

11—11 of Figure 10 and bringing out more clearly the means for detachably supporting one end of the tilt bar adjacent to the follower pinion or gear unit or member, the rectangular pintle member of the tilt bar being shown as when it may be readily raised and displaced from the socket on the follower pinion member.

Figure 11:
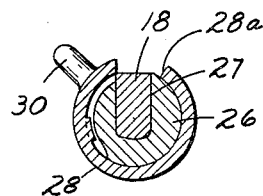
Figure 11 is a sectional view taken on the line
Figure 12:
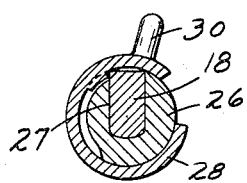

Figure 12 is a view similar to Figure 11 but showing the rotative keeper of Figure 11 turned into its locking position.

Figure 13:
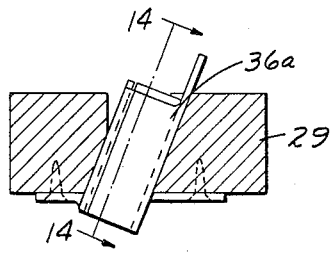
Figure 16:
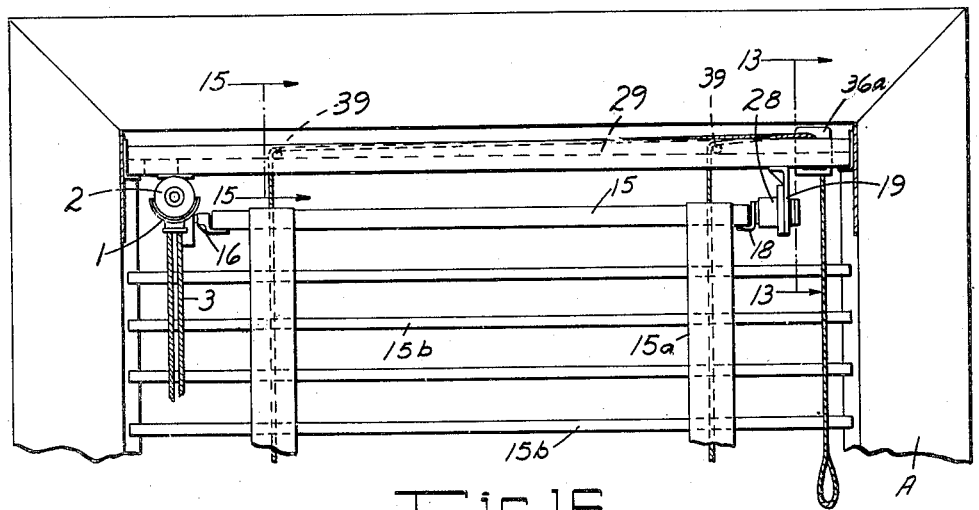

Figure 13 is a sectional view showing the cord guide member on the head rail, the view taken about on the line 13—13 of Figure 16.

Figure 14:
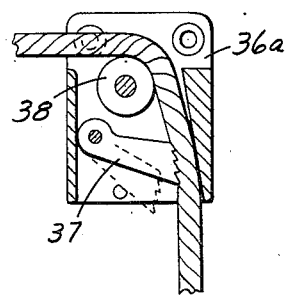

Figure 14 is a sectional view taken about on the line 14—14 of Figure 13.

Figure 15:
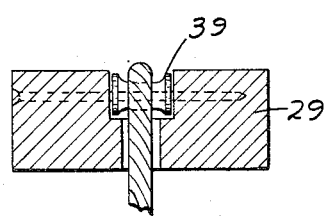

Figure 15 is a sectional view taken about on the line 15—15 of Figure 16, showing the mounting of one of the pulleys in the head rail, which pulley guides one of the blind raising cord members.

Figure 16 is a fragmentary partial front elevation of the upper portion of a window equipped with the blind unit and operating and supporting parts of my invention.

Figure 17:
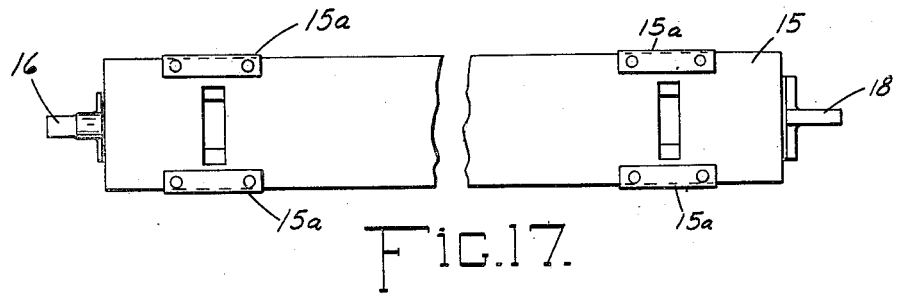

Figure 17 is a top plan view of the tilt bar showing the manner of attachment of the slat tapes thereto, and the formation of the pintle members at opposite ends of said bar.

Figure 18:
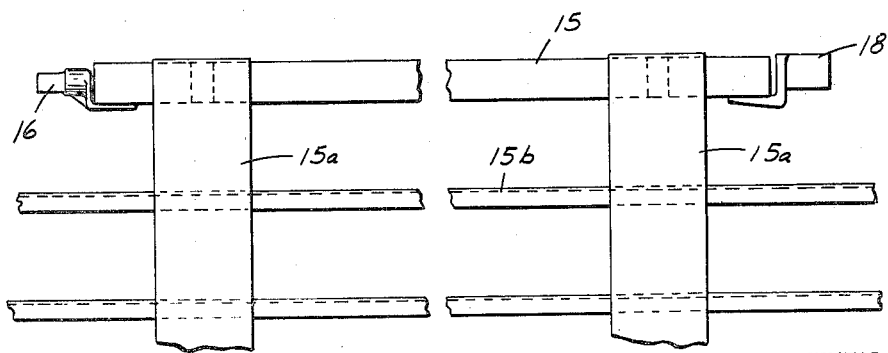

Figure 18 is a front elevation of the parts shown in Figure 17, and additionally showing a couple of the slats that are carried by the tapes attached to the tilt bar.

Proceeding to describe the detail features of my invention, and method of applying the same to a Venetian blind of generally conventional form, reference is first made to Figures 1 to 3 inclusive, and Figure 16. As seen in Figure 16, at the left side of the frame of the window, looking at the said frame from the inside of the house or dwelling or other building on which the window is carried, is located the tilting unit. This unit may be located on the left or right side of the window frame since this makes no difference.

Figure 7:
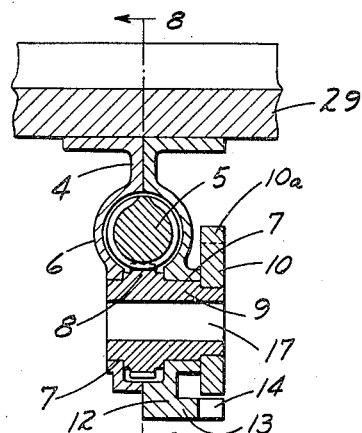
Figure 7 is a vertical sectional view taken about on the line 7—7 of Figure 5.
Figure 8:
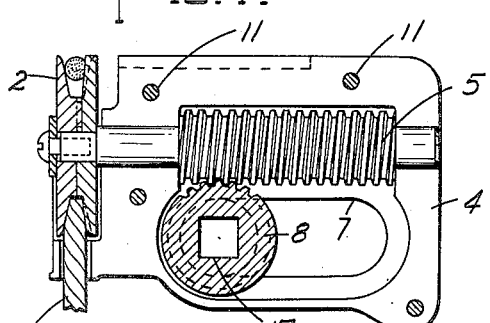
Figure 8 is a vertical sectional view taken about on the line 8—8 of Figure 7.

As seen in Figures 7 and 8, and Figure 16 particularly, the tilting device comprises the usual worm shaft 1 carrying at its inner end the customary cord pulley 2 fixed to said shaft. The tilting cord 3 passes around the grooved portion of the pulley 2 and the operating ends of the cord 3 are pendant from the tilting unit in the customary way. The worm shaft 1, see Figures 7 and 8, is mounted in a bracket 4 and the worm 5 fixed on the shaft 1 is adapted to turn in the hollow portion of said bracket designated 6. Mounted in a suitable bearing portion 7 of the bracket 4 is the worm engaged pinion 8 which is provided with an offstanding trunnion portion designated 9 at the outer end of which is carried a travel gear or pinion member 10 fixed to turn with the gear 8.

The bracket 4 may be made in complemental sections for the purpose of facilitating die casting of the same, though the bracket may be formed, if desired, of stamped out parts held together in the same manner as the sections of the die cast parts, namely, by means of pins 11, see Figure 8. The larger diameter portion of the gear 8, previously called the worm pinion, is embraced between the sections of the bracket 4 so as to maintain the pinion 8 in proper location of operating position on the bracket, in a manner in which it cannot be displaced. The bearing portions 7 of the bracket 4, provided for the gear 8, are in the form of slotted portions at the lower ends of the two sections of the brackets, see Figures 7 and 8 as well as Figure 6. It is therefore possible, upon the turning of the worm 5 by the pulley 2 and shaft 1, for the gear 8 or worm pinion to travel along the worm 5 and longitudinally inwardly or outwardly of the slot bearings 7 above referred to. The travel pinion or gear member 10 is disposed exteriorly of the bracket means 4 at one side of the latter.

One of the complemental parts of the bracket 4, or sections, as previously referred to, the right one as seen in Figure 7, is formed at its lower edge portion with an extension 12, which extension is provided with a flange 13 having a rack composed of a series of teeth designated 14 formed at its outer edge.

The travel gear or pinion 10 is really a gear sector formed with a series of teeth 10a which are adapted to mesh or engage with the teeth 14 on the extension 12 at the lower portion of the bracket 4.

Figure 4:
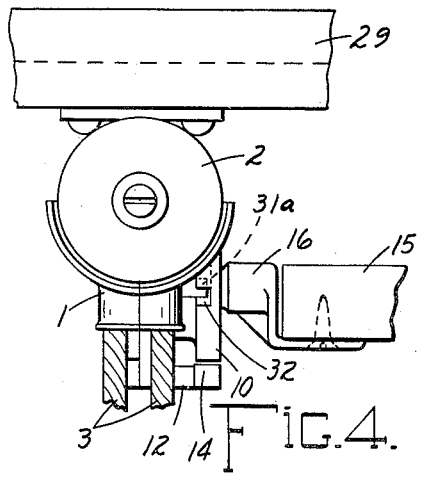
Figure 4 is a fragmentary view in front elevation showing the blind tilter unit as carried by the head rail usually secured to the top of the window frame, and a portion of the tilt bar which is supported by the tilting unit.
Figure 5:
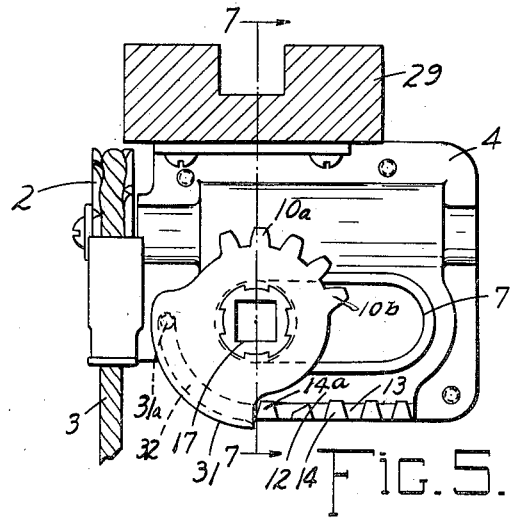
Figure 5 is a view in vertical section showing primarily the parts that are illustrated in Figure 4 but additionally showing more clearly the bracket means and the traveling pinion or gear members that support the tilt bar or pulley than in Figure 4.
Figure 6:
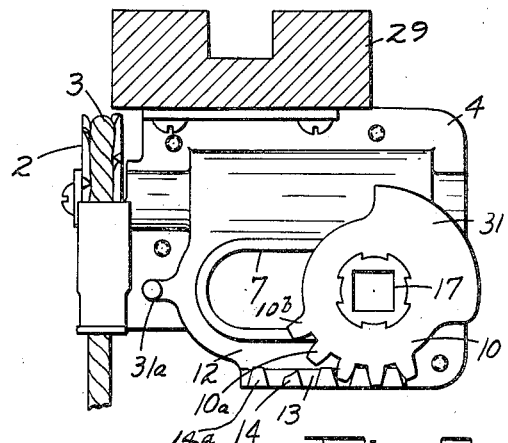
Figure 6 is a view similar to Figure 5, but illustrating the tilt bar supporting gear or pinion members in their outermost positions of movement as distinguished from Figure 5 that shows these parts with the tilt bar in the innermost position assumed thereby in the use of my invention.

From the foregoing construction it will be clear that as the worm pinion 8 is rotated by the worm 5, the travel pinion 10 would similarly be rotated because fixed to the member 8, and the turning of the pinion member 10 will cause it to travel along the rack provided by the teeth 14, as quite clearly depicted in the views Figures 5 and 6.

The worm tilting unit just described constitutes the support for one end of the tilt bar 15, which, as seen in Figures 17 and 18, is equipped at the said one end, the left end as viewed, with a square or poly-sided pintle member 16. The pintle member 16 is adapted to be interengaged with a square opening in the trunnion portion 9 of the worm pinion 8, which opening is designated 17.

Figure 9:
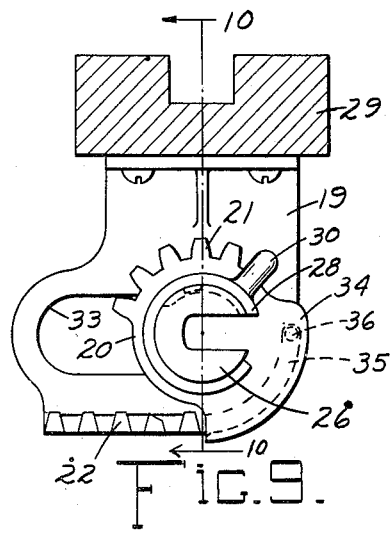
Figure 9 is a view of the bracket means and the follower pinion or gear member, showing more clearly the guide member provided on the gear or pinion member to coact with the stationary pin or projection on the side of the bracket.

For supporting the other end of the tilt bar 15, the latter is equipped with a poly-sided pintle member 18 adapted to be mounted in a supporting bracket means such as shown in Figures 9 and 10 particularly, the same comprising a simple form of bracket 19 for carrying the travel pinion member 20 which is of a general construction somewhat similar to the travel pinion member 10 previously described, except that the follower travel pinion 20 is not provided with the connected gear 8 as is the pinion member 10, such gear not being necessary for my purposes. The pinion member 20, which will be called the follower pinion member because it follows the movement of the main and first described pinion 10, is provided with teeth of a sector of teeth, designated 21, and these teeth mesh with teeth 22 providing a rack at the lower edge of the bracket 19 below the bearing portion of the pinion member 20. The pinion member 20 has a trunnion or hub portion 23 which is mounted in a suitable bearing opening in the lower portion of the bracket 19, and held from displacement by means of a washer 24 and attachment plate 25. Projecting from the side of the pinion member 20 opposite the hub or trunnion portion 23 is a tilt bar supporting member in the form of a circular projection 26 which is provided with an elongated slot 27. The slot 27 is shaped to conform with the shape of the right hand pintle member 18 of the tilt bar 15, and since the slot is opened to one portion of the periphery of the projection 26, the pintle member 18 may be inserted or removed from the slot 27 at will. For locking the pintle member 18 in the slot 27, however, I utilize a keeper or lock member 28 of somewhat circular form interrupted at a portion of its periphery as seen at 28a in Figure 11, so that the interrupted portion may be brought to register with the outer edge portion of the pintle member 18, whereupon the pintle member 18 may be displaced from the projection 26, enabling removal of the tilt bar 15 and the supported slat and tape portions of the blind unit bodily from engagement with the members 10 and 26, or 20, referring to the follower pinion member. That is to say, when it is desired to detach the Venetian blind unit comprising the tilt bar, slats, and tape, from the supporting bracket means carried by the head rail designated 29, a fingerpiece 30 on the keeper 28 will enable manipulation of the latter from the position of Figure 12 to that of Figure 11, and the tilt bar 15 may be detached by first raising the pintle member 18 out of the slot 27, and thereafter pulling the tilt bar 15 in the direction of the bracket 19 to disengage its square pintle member 16 from the square opening in the pinion member 10, said opening designated 17.

Describing another feature of the pinion member 10, it is notable as seen in Figures 5 and 6, that this member 10 is equipped with an arcuate or sector shaped guide member 31 formed with an arc-shaped guide groove 32 at one side thereof. Thus, when the pinion member 10 is rotated by the pulley 2 and the tilt cord means 3, to cause that member to travel under the turning action of the gear 8, to the inner end of the slot bearing 7, if any further rotation of the member 10 is required, it will cause its guide slot 32 to engage with a pin 31a on one of the sections of the bracket 4, the adjacent section, and allow disengagement of the last tooth 10b of the member 10 from tooth 14a of the rack flange 13 previously described, and on reverse rotation of member 10 to assure that tooth 10a of member 10 reengages between rack teeth of rack flange 13, thus remeshing the teeth of member 10 with the said last teeth in the same positions as they were prior to disengagement.

The bearing 33 in the bracket 19 supplied for the hub or trunnion portion 23 of the follower pinion member 20 is an elongated slot bearing like the bearing 7 of the bracket means 4, so that when the pinion member 10 is turned by the gear 8 under the action of the pull cord means 3, and travel is imparted through the worm 5 to the gear 8 and the pinion member 10, a corresponding movement of the pinion member 20 in the bearing slot 33 will be effected, and in this manner the tilt bar 15 may be moved outwardly relatively to the window frame designated A, or inwardly therefrom, carrying the Venetian blind unit of the tapes and slats along with it in the same direction of movement. The pinion member 20 is equipped with a sector of arc-shape, 34, similar to the guide means 31 and 32, and formed with a corresponding arc-shaped guide slot 35 to coact with a pin 36, all likewise corresponding with the equivalent parts associated with the pinion member 10 and for the same purpose.

The operation of my Venetian blind means, largely comprising the unit made up of the tilt bar 15 and the tapes 15a and slats 15b, is practically the same, generally speaking, as in respect to the construction in my previously mentioned patent, save that the operation is effected by newly designed parts advantageously arranged and improved upon in accordance with the disclosure herein.

When the Venetian blind is to be closed, it will be tilted by the bar 15 tilting the slats by action of the tapes in the manner shown in Figure 3, and as the blind is so closed it will be caused to move bodily including all of said parts 15, 15a, and 15b, outwardly toward the window frame A. Thereafter, a reverse movement of the tilting device for opening the blind and reversely tilting the slats will effect a bodily movement of the blind unit per se inwardly away from the frame A of the window.

Figure 13 illustrates a cord lock and guide member 36a mounted on the head rail 29 for guiding one of the raising cords of the blind, and the details of this means are illustrated in Figure 14, including the cord locking member 37 and guiding pulley 38. In Figure 15 a single guiding pulley for another of the raising cords, designated 39, is used. The parts of Figure 13, and Figures 14 and 15 are largely conventional.

It is apparent that initial rotation of the pinion members may cause them to travel in one direction along the slots of the brackets, and when they reach their outer limits of sliding movement they will rotate about a fixed axis, that of the tilt bar, due to action of the guide members 31 and 31a, and 35 and 36.

A movable valance board 40 may be used, but forms no part of the present invention.

My invention is especially adapted for use in connection with present shallow frame windows such as used on government housing projects, as well as for windows generally.

Having thus described my invention, what I claim as new and desire to secure by Letters Patent of the United States, is:

1. In combination, Venetian blind supporting brackets adapted to be attached to opposite sides of a window frame, a Venetian blind comprising a tilt bar and tiltable slats carried thereby, devices coacting with the brackets to support the tilt bar for tilting, said devices being operable to tilt the slats at one angle and move the blind bodily in one direction, and tilt the slats at an opposite angle and move the blind bodily in an opposite direction, and means including instrumentalities for causing the tilt bar to rotate about a stationary axis when it reaches the limit of its bodily movement in one direction, said means comprising elements for holding said tilt bar translationally stationary during said latter rotation.

2. The combination of parts of claim 1, wherein the said instrumentalities consist of guide members rotative at the axis of the tilt bar, and parts fixed to the brackets and engageable by the guide members.

3. In combination, Venetian blind supporting brackets adapted to be attached to opposite sides of a window frame, a Venetian blind comprising a tilt bar and tiltable slats carried thereby, devices coacting with the brackets to support the tilt bar for tilting, comprising pinion members interlocked with the ends of the tilt bar and slidable on the brackets in opposite directions, racks on the brackets having teeth to engage those of the pinion members to cause movement of the tilt bar and slats in one direction or an opposite direction depending on the direction of rotation of said pinion members to tilt the tilt bar, means to rotate the pinion members for sliding travel movement, and instrumentalities to cause rotative action of the pinion members about a stationary axis at a predetermined point in their travel movement, said instrumentalities comprising an arcuate slot in said pinion and a pin carried by said bracket and engageable in said slot.

4. Means as claimed in claim 3, in which the rotative action of the pinion members about a fixed axis takes place at the limit of movement of said members away from the window, and the instrumentalities comprise guides disposed on arcs generated with the axis of the pinion members as a center, and members on the brackets engaged by said guides.

5. A bracket hardware unit for supporting the tilt bar of a Venetian blind, comprising, a bracket having a horizontal toothed rack, a pinion member having teeth engaged with said rack and interlockingly engageable with an end of said tilt bar, a gear on the bracket, said bracket having a horizontal slot in which the gear may slide, and said gear being connected with the pinion member to rotate therewith, and means to rotate the gear, wherein said pinion is provided with teeth for a predetermined portion of its periphery, and means on another portion of said pinion to coact with said bracket for holding said gear translationally stationary at one end of travel thereof while permitting rotation of said pinion.

6. Means as claimed in claim 5, in which the pinion member is formed with guide means on an arc having the axis of the pinion member and gear as a center, and a projection on the bracket engageable by rotative action of the guide means of the pinion member when the latter moves to a point approximately at the end of the said slot of the bracket.

7. A unit as claimed as claim 5, in which the bracket is made of complemental connected parts holding the gear between them, a worm also held between the said bracket parts and operable to turn the gear, one of said bracket parts having a flange in which the teeth of the rack are formed, the pinion member being mounted above the said rack teeth.

JOHN W. DUNN.

REFERENCES CITED

The following references are of record in the file of this patent:

UNITED STATES PATENTS

| Number    | Name      | Date          |
|-----------|-----------|---------------|
| 1,271,619 | Sapper    | July 9, 1918  |
| 1,822,318 | Russell   | Sept. 8, 1931 |
| 2,224,712 | Balthasar | Dec. 10, 1940 |
| 2,413,754 | Dunn      | Jan. 7, 1947  |